Oct. 20, 1970  E. A. KNOWLTON  3,534,936
ROTARY OPERATIVE VIBRATION DAMPING FASTENER
Filed July 31, 1968
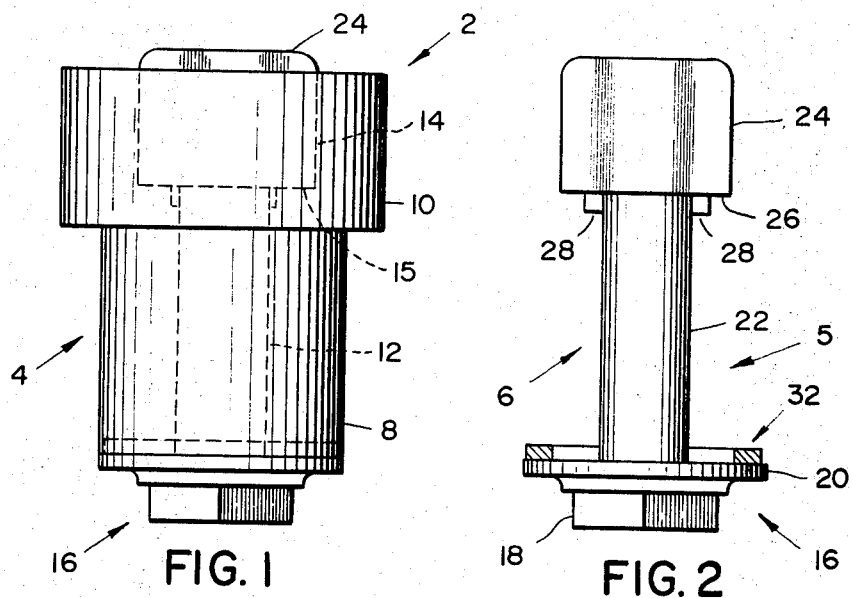
FIG. 1
FIG. 2
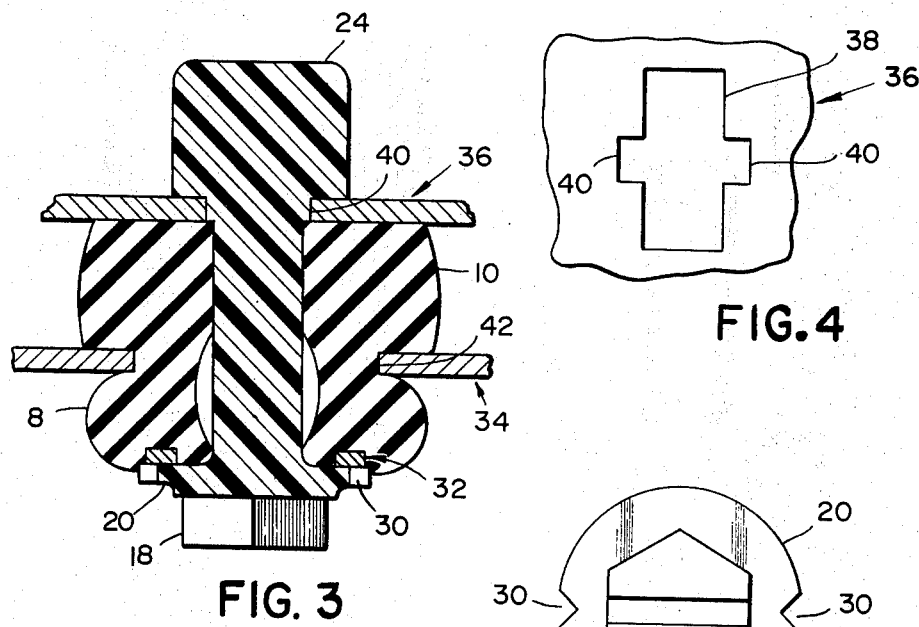
FIG. 3
FIG. 4
FIG. 6
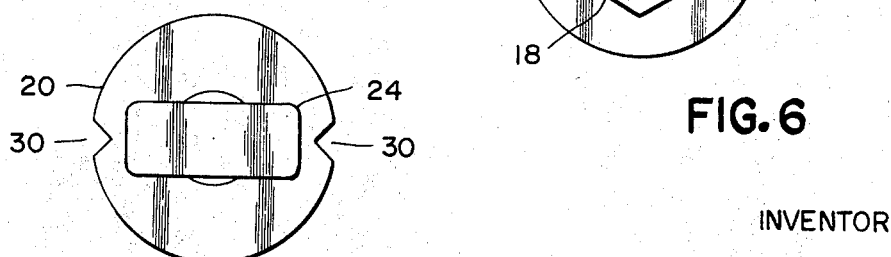
FIG. 5
INVENTOR
EDWARD A. KNOWLTON
BY
James R. O'Connor
ATTORNEY United States Patent Office 3,534,936
Patented Oct. 20, 1970

3,534,936
ROTARY OPERATIVE VIBRATION DAMPING
FASTENER
Edward A. Knowlton, Winchester, Mass., assignor to
United-Carr Incorporated, Boston, Mass., a corporation of Delaware
Filed July 31, 1968, Ser. No. 749,079
Int. Cl. F16f 15/08
U.S. Cl. 248—358                               11 Claims

ABSTRACT OF THE DISCLOSURE

A fastener combination for securing an apertured member to an apertured supporting structure includes a resilient sleeve of an elastomeric vibration damping material and a rotary operative stud extending through said sleeve. The sleeve is adapted to be passed through the aperture in the member and the stud has a radially extending arm which is adapted to be passed through the aperture in the supporting structure and locked against the remote surface of the structure responsive to a fractional turn of the stud from its insertion attitude. As the stud is passed through the supporting structure and rotated to the locked position, the sleeve is axially and radially deformed, thereby imparting a constant locking tension to the stud which is transmitted to the member and the supporting structure.

BACKGROUND OF THE INVENTION

Field of the invention

The invention relates to vibration damping fasteners.

Description of the prior art

From the patented prior art one is apprised of elastically deformable fasteners for attaching apertured members to apertured supporting structures in abutting or spaced, cushioned relationship. In many instances a hollow sleeve of deformable material encapsulates a threaded nut. The nut is usually located adjacent the end of the body of the sleeve remote from a radial flange and the coupling is effected by passing the body of the sleeve through the aperture in the supporting structure, placing the member to be fastened against the radial flange of the sleeve, passing a threaded bolt through the aperture in the member and into the sleeve, and thereafter torquing the bolt into the nut to cause the body of the sleeve to pull in axially and deform radially against the remote surface of the supporting structure. In other cases the sleeve encapsulates a threaded bolt and the coupling is carried out in the manner described above, except that a threaded nut is torqued onto the end of the bolt to effect the deformation of the body of the sleeve.

The prior art also includes a rotary operative, anti-vibration fastener wherein a stud having a radial cross pin engages a separate cam plate held against the end of the body of an elastomeric sleeve to effect axial and radial deformation of the sleeve.

The present invention is seen to represent a substantial improvement both structurally and functionally, over the known devices mentioned above, as will become evident from a reading of the detailed description of the invention which follows hereinafter.

SUMMARY OF THE INVENTION

According to the invention, a fastener for securing an apertured member in spaced relationship to an apertured supporting structure comprises a sleeve of elastomeric vibration damping material and a rotary operative stud assembled with the sleeve. The sleeve includes a main body portion having a bore extending therethrough and a radial flange at one end of the body portion. The body portion is adapted for press fit assembly in the aperture in the member to be fastened. The stud includes a head which is disposed adjacent the end of the body portion remote from the radial flange of the sleeve, a shank extending from the head into the bore in the body portion, and a radially extending arm joined to the shank adjacent its end remote from the head and defining a shoulder facing the head at its intersection with the shank. The radial arm of the stud is disposed in the bore in the body portion of the sleeve and normally extends outwardly at least a slight distance beyond the end of the body portion proximate the radial flange. The radial arm of the stud is adapted to be passed through the aperture in the supporting structure in one attitude and locked against the remote surface of the structure responsive to a modest rotational force applied to the head of the stud whereby said arm is rotated a fractional turn from one attitude. The body portion and radial flange of the sleeve are thus axially compressed and radially expanded and in the aforesaid condition provide a locking tension which is transmitted through the stud to the fastened member and the supporting structure. In its deformed condition the sleeve provides a vibration damping buffer between the fastened member and the supporting structure and also provides a seal inhibiting the egress of fluids through the apertures therein.

BRIEF DESCRIPTION OF THE DRAWINGS

FIG. 1 is a side elevation of a fastener combination according to the invention;

FIG. 2 is a side elevation of the stud and washer components of the fastener depicted in FIG. 1;

FIG. 3 is a transverse cross-sectional view depicting the fastener of FIG. 1 securing an apertured member to an apertured supporting structure;

FIG. 4 is a fragmentary plan view depicting the aperture in the supporting structure in detail; and FIGS. 5 and 6 are plan views of the stud looking from the top and bottom of FIG. 2, respectively.

The fastener 2 is comprised of a resilient sleeve 4 of an elastomeric material, for example, polyurethane rubber having a hardness on the order of 60 durometer; and a stud and washer combination 5 assembled with the sleeve.

The sleeve 4 includes a generally cylindrical, main body portion 8 and a radial flange 10 adjacent one end of the body portion. A bore 12 extends through the body portion and the end of the bore adjacent the flange 10 is countersunk at 14. The base of the countersunk portion provides a stud retaining abutment 15.

The stud 6 includes a head 16 having a portion 18 engageable by a tool for rotating the stud, such as a wrench or screwdriver and a radially extending disc 20 joined to the portion 18, a shank 22 joined to and extending from the head 16, a generally rectangular arm 24 joined to the end of the shank opposite the head 16 and defining a perpendicular shoulder 26 facing the head at the intersection of the arm with the shank, and a pair of short, narrow lugs 28 joined to the shank adjacent the shoulder 26.

In the embodiment depicted in the drawing the stud 6 is of one-piece, molded, synthetic resinous construction, for example, the acetyl resin marketed by Du Pont under the registered trademark, "Derlin" which material is characterized by its stiffness, good tensile strength, creep resistance over a wide range of temperature variations, high fatigue endurance and resilience for applications requiring springiness and toughness. However, it is anticipated that the stud might be molded from other tough, heat resistant synthetic plastics and might also be of cast metallic construction.

The disc 20 of the stud is notched at 30 for purposes to be described hereinafter. Washer 32 which is of sheet metal construction overlies the surface of the disc 20 opposite the shoulder 26 of the stud and circumscribes the shank 22.

The illustrated embodiment of the invention is produced by introducing the elastomeric material in a liquid state into an open cavity mold and thereafter placing the stud and washer assembly of FIG. 2 in the liquid material axially centered in the mold with the head 16 adjacent the bottom of the mold cavity. The elastomeric material is thereafter cured and the composite fastener is immediately ejected from the mold. As will become evident from sections of this description to follow, it is critical to ultimate proper functioning of the fastener that the sleeve material does not adhere or become bonded to the stud 16 during the above described molding process. The stud is therefore predipped in and becomes coated with a release agent, such as a wax, which will inhibit bonding of the sleeve to the stud during the curing phase of the production process or thereafter. Therefore, since there is no adhesion of the elastomeric material to the stud, and further, since there must be some element in the combination to which the material will adhere in order to hold the end of the body portion 8 remote from the flange 6 close to the stud shank 22 when the fastener is employed in a typical application as will be described hereinafter, a metallic washer 13 is placed against the disc 20 of the stud head and is precoated with a suitable primer which enhances a secure bonding of the body portion to the washer during the curing operation.

It should be noted, however, that it is the absence of any adhesion or bonding of the elastomeric material to the stud shank 22 and radial arm 24 which is most critical to the efficient functioning of the fastener. That the stud shank should be free for easy axial and rotational movement with respect to the sleeve and the body portion of the latter be free for axial and radial deformation when the fastener is applied in the manner to be described hereinafter are the important points to be grasped. Thus it is possible to eliminate the washer 32 from the combination, in which case the stud shank is coated with the releasing agent, the stud head is coated with the primer and the end of the body portion 8 is bonded to the disc 20 of the stud head. When the stud is rotated during application, the body portion is twisted but remains bonded to the stud head and the fastener otherwise functions in the manner contemplated by the preferred embodiment.

On the other hand, the reader will appreciate that the addition of the washer 32 simplifies the molding process in that the entire stud 6 may be predipped in the release agent and the washer coated with a primer in separate operations which need not be controlled to the degree necessary for coating different portions of the stud with the different substances. Thus the washer 32 is an important, although not an absolutely necessary element in the overall context of the invention.

FIG. 3 depicts a typical installation wherein the fastener 2 secures an apertured member 34 to an apertured supporting structure 36. As depicted in detail in FIG. 4, an appropriately contoured aperture 38 in the supporting structure has an elongated rectangular configuration for receipt of the radial arm 24 of the stud. A pair of opposed, shallow notches 40 communicate with the aperture 38 intermediate the longer side edges of the support defining same. The member 34 has an internal, generally circular aperture 42 having a diameter proximate the external diameter of the body portion 8 of the fastener sleeve. The attachment of the member to the supporting structure is effected by initially pressing the body portion 8 of the sleeve into the aperture 42 until the flange 10 abuts the member. Due to the dimensional relationship between the body portion and the aperture 40 recited above, a rather tight press fit relation obtains and one or more fasteners may be readily assembled to a given member at an early stage of an assembly line operation and will be retained in assembly during transport of the member from one station to another. Ultimately the subassembly of the fastener 2 and the member 34 is placed against the supporting structure 36 with the notches 30 in the disc 20 of the stud centrally paralleling the longer dimension of the aperture 38 in the support. The portion 18 of the stud head is then engaged by an appropriate tool and a modest axial force is applied to force the radial arm 24 through the aperture 38 until the shoulder 26 clears the remote surface of the support structure. Responsive to the aforesaid application of axial force, the sleeve 4 is axially and radially deformed to the extent depicted in FIG. 3 or to a greater or lesser extent depending on the thickness of the structure 36. Immediately upon clearance of the remote surface of the structure by the shoulder 26, the stud is rotated 90° and the shoulder locks against the structure. When the stud is turned, the lugs 28 snap into the notches 40 to effect a positive, releasable attachment. Thus the member 34 is secured to the supporting structure in spaced, buffered relationship with respect thereto and the sleeve 4 subsequently acts to damp out vibration which might adversely affect the functioning of sensitive equipment mounted on the member 34. The sleeve 4 also provides a highly effective seal against the egress of moisture through the apertures 38 and 42 in the support structure and fastened member, respectively. The fastener can be easily released by either a reverse or additional forward quarter turn and can be readily reused in the same or another application due to the strong tendency of the elastomeric material to return to its original undeformed configuration.

From the foregoing detailed description the reader will appreciate that the present fastener combination represents a substantial improvement over the threaded devices mentioned heretofore in that it can be applied in a rapid and extremely simple fashion without the necessity of any special tools and is in effect a self-contained fastener which does not require nuts, bolts, cam plates or other separately supplied and applied components for its utilization. Further, the simplicity of the fastener components and the manufacturing process earlier described render it an inexpensive and yet highly efficient fastener which is extremely attractive to the price-conscious and users in today's competitive fastener market.

I claim:

1. A fastener for securing an apertured member in buffered, vibration damping relationship to an apertured supporting structure, said fastener having been formed by casting a resilient sleeve of elastomeric vibration damping material about a stud and washer assembly, said sleeve including a body portion having a bore extending axially therethrough and a radially extending flange adjacent one end of said body portion, and a stud washer assembly including a washer which is bonded to the end of said portion remote from said radial flange and a stud having a head engageable by a tool for rotating the stud bearing against the surface of said washer most remote from said radial flange and a shank extending from the said head through the washer and the bore in said body portion and beyond the end of said body portion proximate said radial flange, said stud being coated with a release agent which inhibits adhesion of said sleeve to said stud.

2. A fastener for securing an apertured member in buffered, vibration damping relationship to an apertured supporting structure, said fastener comprising a resilient sleeve of elastomeric, vibration damping material, said sleeve including a body portion having a bore extending axially therethrough and a radially extending flange adjacent one end of said body portion, and a stud and washer assembly including a washer which is adhesively bonded to the end of said body portion of said sleeve remote said radial flange and a stud having a head engageable by a tool for rotating the stud, said head bearing against the surface of said washer most remote from said radial flange, and a shank extending from the said head through the washer and the bore in said body portion of said sleeve and beyond the end of said body portion proximate said radial flange, said stud shank being free to rotate in the bore in said sleeve and said stud head being free to rotate against the said surface of said washer.

3. A fastener for securing an apertured member in spaced relationship to an apertured supporting structure, said fastener comprising a sleeve of elastomeric, vibration damping material including a body portion having a bore extending therethrough and a radially extending flange adjacent one end of said body portion, and a rotary operative stud having a head disposed adjacent the end of said body portion remote from said radial flange, a shank joined to said head and extending into the bore in said body portion and a radially extending arm joined to said shank adjacent its end remote from said head and providing a shoulder facing said head adjacent the intersection with said shank, said arm being disposed in said bore in said body portion adjacent the end of said body portion proximate said radial flange, said body portion being adapted to be passed through the aperture in the member, said radial arm of said stud being adapted to be pressed through the aperture in the supporting structure and rotated responsive to a turning of said stud to a position where said shoulder locks against the remote surface of the supporting structure, whereby said body portion and said radial flange are axially compressed and radially expanded thereby providing a locking tension which is transmitted from said sleeve through said stud to the member and the supporting structure, said flange in its compressed condition providing a vibration damping buffer between the member and the supporting structure and said body portion providing a seal at the aperture in the fastened member.

4. A fastener according to claim 3 including means on said stud shank cooperable with the edges of the supporting structure defining the aperture therein to releasably maintain the said radial arm in its locking position with respect to the structure.

5. A fastener according to claim 4 wherein said means is a pair of radially extending lugs disposed on said shank adjacent said shoulder defined by said radial arm.

6. A fastener according to claim 3 wherein said stud head includes a radial disc and means engageable by a tool for turning said stud.

7. A fastener according to claim 3 wherein at least a portion of said radial arm on said stud normally extends axially beyond the end of said body portion adjacent said radial flange of said sleeve to provide a lead into the aperture in the supporting structure.

8. A fastener according to claim 3 including a washer disposed between the body portion of said sleeve and the head of said stud, said body portion being bonded to said washer and said stud head being rotatable with respect to said washer.

9. A fastener according to claim 8 wherein said stud is of one-piece, synthetic resinous construction.

10. A fastener according to claim 8 wherein said washer is of sheet metal construction.

11. A fastener according to claim 3 wherein the said bore in said sleeve has a countersunk portion adjacent its end proximate said radial flange, the base of said countersunk portion providing an abutment disposed opposite the shoulder defined by said radial arm, which abutment cooperates with the head of said stud to maintain said sleeve and said stud in assembly.

References Cited

UNITED STATES PATENTS

| | | | |
|---|---|---|---|
| 2,688,894 | 9/1954 | Modrey | 85—70 |
| 3,051,607 | 7/1962 | Werth | 264—242 |
| 3,053,046 | 9/1962 | Fleming | 248—358 X |
| 3,060,538 | 10/1962 | Simi | 248—22 X |
| 3,223,374 | 12/1965 | Butler | 248—22 X |

CHANCELLOR E. HARRIS, Primary Examiner

U.S. Cl. X.R.

24—221; 85—70; 248—22; 264—242

UNITED STATES PATENT OFFICE
CERTIFICATE OF CORRECTION

Patent No. 3,534,936  October 20, 1970

Edward A. Knowlton

It is certified that error appears in the above identified patent and that said Letters Patent are hereby corrected as shown below:

Column 3, line 6, "Derlin" should read -- Delrin --; line 69, "necessary" should read -- necessary, --. Column 4, line 57, "and" should read -- end --; line 69, before "portion" insert -- body --. Column 5, line 12, before "said" insert -- from --.

Signed and sealed this 6th day of April 1971.

(SEAL)
Attest:

EDWARD M. FLETCHER, JR.
Attesting Officer

WILLIAM E. SCHUYLER, JR.
Commissioner of Patents